United States Patent [19]
Luciw

[11] Patent Number: 5,978,766
[45] Date of Patent: Nov. 2, 1999

[54] MACHINE, METHOD AND MEDIUM FOR ASSISTED SELECTION OF INFORMATION FROM A CHOICE SPACE

[75] Inventor: William W. Luciw, Woodinville, Wash.

[73] Assignee: Starwave Corporation, Bellevue, Wash.

[21] Appl. No.: 08/575,814

[22] Filed: Dec. 20, 1995

[51] Int. Cl.$^6$ .................................................. G06F 17/60
[52] U.S. Cl. .................................................. 705/1; 705/10
[58] Field of Search .................... 388/14; 705/1, 705/10; 707/3, 4, 5, 6

[56] References Cited

U.S. PATENT DOCUMENTS

| | | |
|---|---|---|
| 5,390,281 | 2/1995 | Luciw et al. . |
| 5,410,344 | 4/1995 | Graves et al. ............................. 348/1 |
| 5,434,777 | 7/1995 | Luciw . |
| 5,446,891 | 8/1995 | Kaplan et al. ............................. 707/2 |
| 5,477,447 | 12/1995 | Luciw et al. . |
| 5,583,763 | 12/1996 | Atcheson et al. ......................... 707/3 |
| 5,617,565 | 4/1997 | Augenbraun et al. .................... 707/4 |
| 5,734,720 | 3/1998 | Salganicoff ............................. 380/20 |
| 5,740,549 | 4/1998 | Reilly et al. ............................. 705/14 |
| 5,749,081 | 5/1998 | Whiteis ................................. 707/102 |

*Primary Examiner*—Stephen R. Tkacs
*Assistant Examiner*—Alexander Kalinowski
*Attorney, Agent, or Firm*—David E. Lovejoy

[57] ABSTRACT

A machine, method and computer-readable medium for presenting one or more users with suggestions of items from a choice space, wherein the items chosen for presentation are based upon explicit and/or observed preferences of the user. The present invention contemplates use in any number of paradigms involving large user choice spaces, including those relating to the internet and on-line arenas, as well as those relating to television.

62 Claims, 8 Drawing Sheets

MACHINE, METHOD AND MEDIUM FOR ASSISTED SELECTION OF INFORMATION FROM A CHOICE SPACE

BACKGROUND OF THE INVENTION

1. Field of the Invention

The present invention relates to a scheme for providing one or more users with suggestions for particular items that may be of interest to them from a choice space of items that would be cumbersome or undesirable to navigate through using conventional techniques. More particularly, the present invention relates to a machine, method and medium for adaptably determining items from the choice space that may be of interest to a particular user, and to suggest those items to the user for his or her review. To implement this, embodiments of the present invention envision that each of one or more users enter explicit information indicating their preferences for certain types of items within the choice space. Then, using that explicit information and further observing what specific items each user actually accesses from the choice space for their use, the present invention suggests items in the choice space that may be of individual interest to each of the one or more users. The present invention contemplates use with any number of paradigms, such as television, the internet, on-line services, etc.

2. Related Art

For hundreds, if not thousands of years, schemes have been implemented to allow people to more easily identify and obtain certain items that they desire from within a given choice space (i.e., from within an entity or system containing a plurality of available items). For example, reference books are often provided with an index in the back of them to allow a user to quickly identify the page or pages on which desired items of information can be found. By using this index, it is not necessary for the user to scan through the pages of a book to find the desired items, or even to try to guess from a table of contents where the desired items might reside.

In today's electronic society, users of information are presented with an ever-increasing choice of available items. Television is a prime example of this. Initially, the television industry started out with relatively few channels of potential program items, and thus it was not difficult for a user to peruse a TV guide to determine what it was they wanted to watch. However, with the advent of cable television and an ever-increasing number of available programs, it has become increasingly difficult for users to navigate through the jumble of offerings.

As a partial solution to this problem, companies such as Starsight Telecast of Freemont, Calif. have created on-line guides for user's to electronically look through the available choice of television programs. However, having to navigate through even this type of scheme may be more cumbersome than today's demanding consumer would want to deal with. In addition, a user may want to be provided with additional information, such as what new shows have been made available that may be of interest specifically to him or her, as well as to be notified of interesting shows that may conflict with a current show being watched.

Television is not the only place where users are given an increasingly large number of choices. This phenomenon is also occurring in the realm of the "internet" and on-line services. For example, a graphical application of the internet known as the World Wide Web (the Web) has continued to gain popularity, as is evidenced by the explosive proliferation of Web "sites." As a result, attempting to find a web site having desired items of information can be a very difficult task. To assist a user in finding desired Web sites, tools such as "excite" (found at Web address www.excite.com) and "yahoo" (found at www.yahoo.com) offer various key word and concept searching capabilities to assist a user to find desired sites and items that may be therein. As with the television situation, however, it nonetheless is often difficult for a user to go digging for information in this way. In both situations, a user may wish to simply be presented with a choice of web sites or television programs that they would likely be interested in. This would be in contrast to, for example, having to think up key words to form a search and then navigate through the often oblique search results obtained therefrom.

Consequently, what is needed is a scheme for identifying items within a choice space that may be of interest to a specific user in a simplified way, and then present those items to the user for his or her review.

SUMMARY OF THE INVENTION

The present invention addresses the problems described above by providing a machine, method and computer-readable medium for presenting one or more users with suggestions of items from a choice space, wherein the items chosen for presentation are based upon explicit and/or observed preferences of the user. Embodiments of the present invention contemplate that this concept can be implemented by providing each user with at least one category interest vector, which is sub-divided into categories commensurate with the nature of the items in the choice space. A knowledge base is envisioned to be accessible to the present invention, and contains a categorized list of the items in the choice space. Then, when a particular user is observed accessing one of the items in the choice space, the appropriate category to which that item belongs is determined by referencing the knowledgebase. An entry in the category interest vector corresponding to that appropriate category is then updated (e.g., incremented).

In addition to observations affecting the category interest vector, a user can also input explicit information indicating a preference for specific categories and/or items in the choice space. Again, this will cause appropriate entries in the category interest vector to be updated.

When the present invention is then called upon to make a suggestion of an item in the choice space to the user, the category interest vector is reviewed to ascertain which of the category entries has a value indicating the greatest user preference. Once this is ascertained, the user will then be presented with a choice of one or more items from one or more of those categories. The present invention contemplates any number of different ways to indicate when a suggestion should be made, and also contemplates any number of other criteria that can be used to further filter the suggestions presented to the user.

The present invention also contemplates embodiments where information such as the point in time (e.g., the date) that a particular item was accessed is recorded. Then, at some later time, those entries in the category interest vector which were updated as a result of observations occurring before a specified date are again updated (e.g., this time decremented) by an amount commensurate with those observations. In this way, the information in the category interest vector is kept current so that it can reflect the changing interests of a particular user over a period of time.

BRIEF DESCRIPTION OF THE DRAWINGS

Various objects, features, and attendant advantages of the present invention can be more fully appreciated as the same become better understood with reference to the following detailed description of the present invention when considered in connection with the accompanying drawings, in which.

DETAILED DESCRIPTION

The present invention relates to a scheme for providing one or more users with suggestions for particular items that may be of interest to them from a choice space of items that would be cumbersome or undesirable to navigate through using conventional techniques. More particularly, the present invention relates to a machine, method and medium for adaptably determining items from the choice space that may be of interest to a particular user, and to suggest those items to the user for his or her review. To implement this, embodiments of the present invention envision that each of one or more users enter explicit information indicating their preferences for certain types of items within the choice space. Then, using that explicit information and further observing what specific items each user actually accesses from the choice space for their use, the present invention suggests items in the choice space that may be of individual interest to each of the one or more users. The present invention contemplates use with any number of paradigms, such as television, the internet, on-line services, etc.

The present invention will now be described in greater detail with regard to the accompanying Figures. For clarity, paradigms relating to television (particularly cable television) and to the internet and on-line services (particularly the world wide web) will be used as examples herein. However, it should be understood that the present invention would be applicable to any type of television or internet/on-line scheme, regardless of the actual mechanism for transmitting the information to the user, and regardless of how the two technologies of computers and television may be intermixed or otherwise formed into a single entity. Further, it should also be understood that the present invention contemplates use in any number of other present or future situations where a user is presented with a significant number of choice space items (i.e., items in the choice space).

Figure 1:
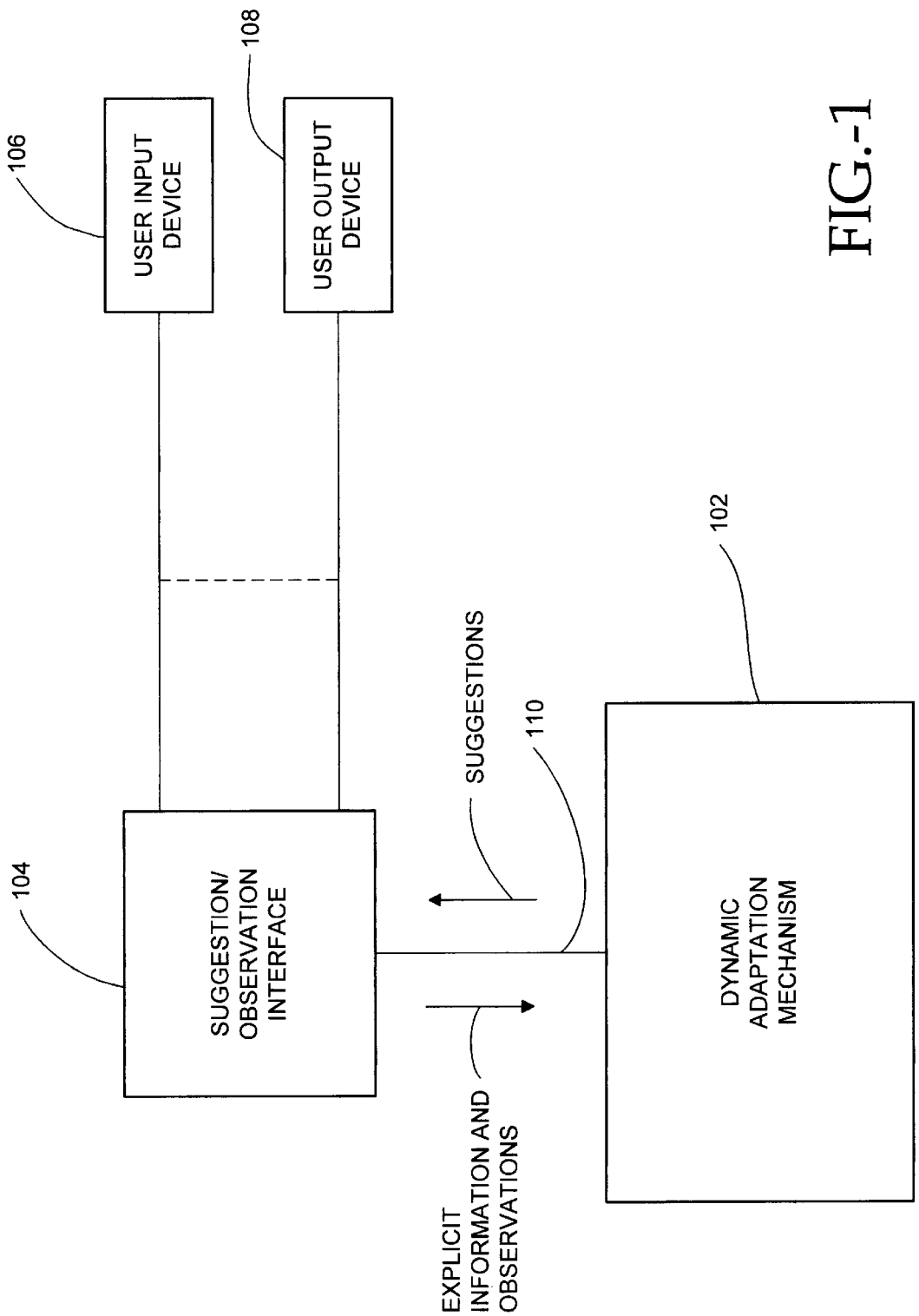
FIG. 1 is a high-level block diagram of embodiments of the present invention, and environments thereof.

Referring now to FIG. 1, a user input device 106 and user output device 108 are shown. Depending upon the particular paradigms contemplated, devices 106 and 108 can represent any number of different mechanisms. For example, in the television paradigms, the user input device 106 could be (or include) a television remote control and the user output device 108 could be (or include) the television screen itself. In the internet/on-line paradigms, the user input device 106 could be (or include) a computer input device such as a mouse and/or keyboard and the user output device 108 could be (or include) a computer monitor. Of course, the present invention contemplates that input and output devices conventionally used for televisions could be used in the internet/on-line paradigms, and that those conventionally used for computers could be used in the television paradigms. The present invention also contemplates that the user input 106 and output 108 devices could be one and the same (e.g., where a touch-screen is used).

A suggestion/observation interface 104 is used to obtain "observations" (i.e., information concerning items that a user has actually been observed to request for his or her use) and to obtain information that the user might explicitly input concerning his or her preferences for the type of items within a choice space relating to the particular paradigms at issue. An example of such explicit information obtained in the television paradigms might result from the user explicitly entering (using, e.g., user input device 106) that he or she likes comedy programs. Then, an example of subsequent observations obtained concerning the user's actual behavior might indicate that the user does, in fact, watch a lot of comedy programs, but that the user actually watches more science fiction programs than comedy programs. The explicit information, in conjunction with the observations, are then used to formulate an overall user-specific preference for items within the choice space, and "suggestions" for viewing other programs can then be presented to the user, as will be explained in greater detail below.

Once the explicit information and/or observations are received by the suggestion/observation interface 104, this information is sent to a dynamic adaptation mechanism 102 via a communication link 110. Embodiments of the present invention contemplate that dynamic adaptation mechanism 102 has access to a database of those items residing in the available choice space. In the television paradigms, for example, the database is contemplated to contain a list of those programs that are available to the user. However, regardless of the paradigm, the explicit information and observations are utilized in conjunction with this database to suggest other items in the choice space that may be of interest to the user. These suggestions are then sent back to the user via communication link 110 for his or her review.

In cable television paradigms, the suggestion/observation interface 104 might be, for example, some type of set-top box, and communication link 110 might be a cable connection to the "head end" of the cable system, where the dynamic adaptation mechanism 102 itself might reside. It should be evident that some type of cable scheme allowing information to be received from a user is contemplated. In internet/on-line paradigms, suggestion/observation interface 104 might be the connection to the transmission system being used (e.g., a modem and/or interface software), communication link 110 might be the transmission system itself (e.g., a telephone or cable connection), and dynamic adaptation mechanism 102 might reside somewhere on one or more remote computers. In both types of paradigms, however, embodiments of the present invention envision that dynamic adaptation mechanism 102 might also reside locally at the user's location, wherein some external scheme would periodically update the database mentioned above.

The present invention envisions that any number of appropriate schemes can be used to make the appropriate observations concerning the actions of a particular user. In internet/on-line paradigms where, for example, the choice space comprises addresses of pages on web sites, the address of a web site page being viewed by the user needs to be sent to the dynamic adaptation mechanism 102. Before describing how this might be done, it is first worth mentioning that in order to view pages on the Web, software such as that known as a "browser" is needed. Browsers are available from several companies, including Netscape Communications Corporation of Mountain View Calif. Many of these browsers have the capability to allow additional software modules to be loaded for customization. Such modules are often known as "Plug-ins".

In embodiments contemplated by the present invention, a Plug-in is envisioned for use with a browser, where the Plug-in does the following:

1) Determines which Web page (also known as a URL or Uniform Resource Locator) was being displayed by the browser by interfacing to the specific extension API (Applications Programming Interface) of the particular browser being used. The Plug-in could also, for example, note the length of time the Web page has been displayed.

2) Establishes a TCP/IP "socket" connection back to the dynamic adaptation mechanism 102. This may be done using standard socket communication techniques which are part of the TCP/IP protocol.

3) Sends the information collected in #1 back to the dynamic adaptation mechanism 102 over the socket connection established in #2 (via communication link 110).

Similarly, in the television paradigms, various schemes exist to identify what a particular user is watching, and how long they are watching it for. Such schemes include using Set Top Boxes (STB) such as the Zenith MM2500 made by Zenith Electronics Corp of Glenview, Ill. or the Pioneer BA-V1000 Command Station made by Pioneer New Media Technologies, Inc. of Upper Saddle River, N.J. Because these boxes have both the ability to recognize the television station they are tuned to and have the ability to establish a two-way data communications path from the subscriber (i.e., user) to the service provider (e.g., at the head end where dynamic adaptation mechanism 102 resides), embodiments of the present invention contemplate the following example implementation:

1) Using the STB API (Set Top Box Applications Programming Interface), record what channel is being tuned and the length of time that has elapsed between tuning intervals, i.e. from channel selection to channel selection.

2) Establish a communications channel from the STB back to the service provider using the STB Communications API. For example, this could be a dedicated switched communications port per user (as in the ATM) or a packet based system like TCP/IP. In any case, using the standard communications features of the STB, set up a communications channel.

3) Transmit the data collected in #1 to the dynamic adaptation mechanism.

Another example of a scheme using the television paradigm utilizes a DirecTV Satellite Receiver, such as an RCA brand Digital Satellite System Model DS2430RW from RCA of Indianapolis, Ind., or a Sony brand Digital Satellite System Model SAS-AD1 from Sony Electronics of Parkridge, N.J. This Receiver has downlink capabilities, the ability to determine what channel is being tuned and how long that channel is being viewed.

It should be understood that, in general, embodiments of the present invention envision that the actual delivery of the content (e.g., television program or data itself) to the user of items in the available choice space is not a central feature implemented by the present invention. However, various embodiments of the present invention do envision situations where the present invention can be integrated with those mechanisms for delivering the actual content to the user.

Finally, it should be understood that the configuration shown in FIG. 1 is way of example only, and that the present invention -contemplates that the various components can be interconnected in different ways and/or that certain components can be an integral part of other components. Also, it should be apparent that multi-user environments are contemplated where, for example, multiple suggestion/ observation interfaces 104 are in communication with one (or at least fewer) dynamic adaptation mechanisms 102.

Figure 2:
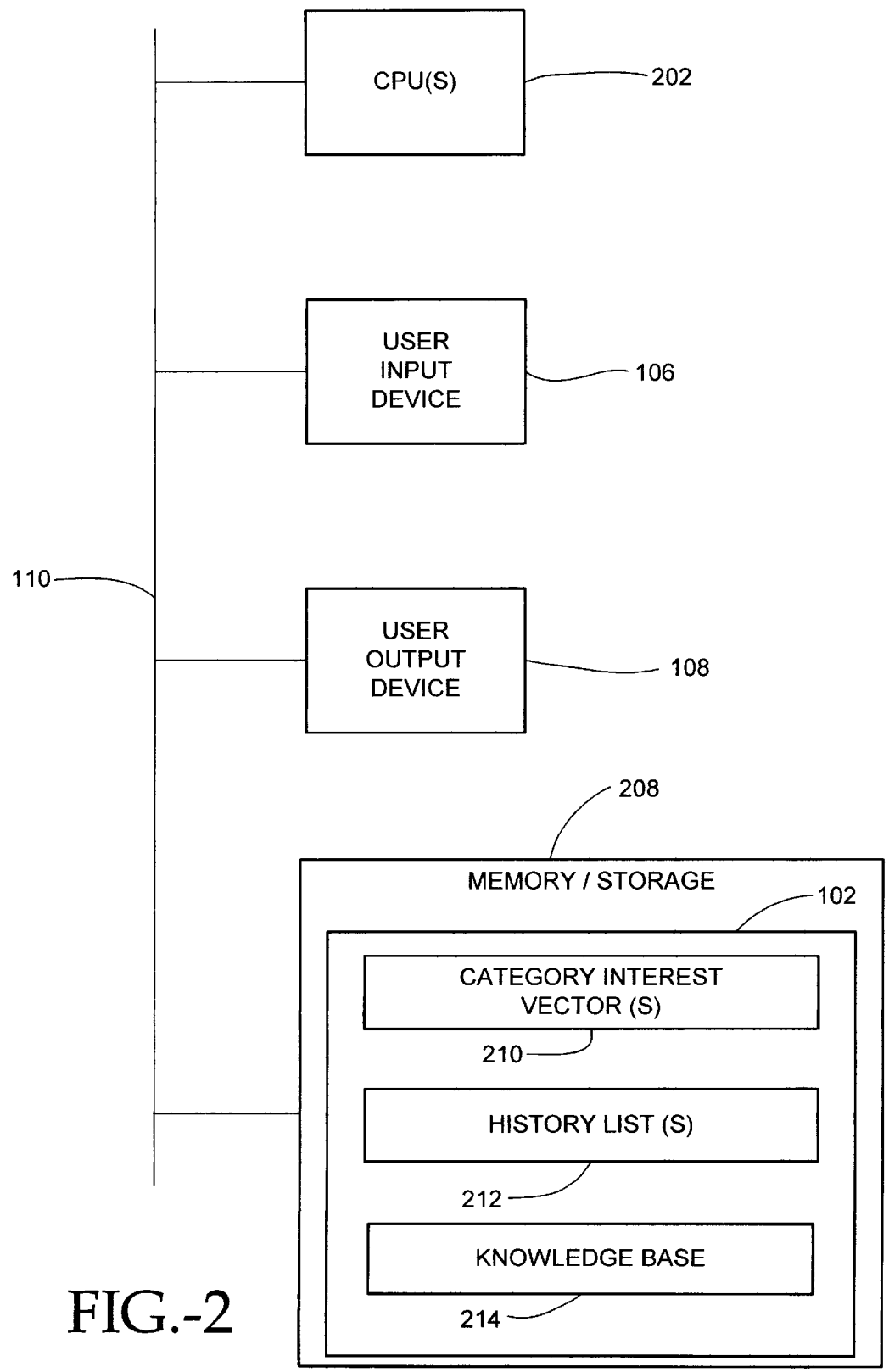
FIG. 2 is a block diagram of a computing device(s), components thereof and communications schemes as contemplated by various embodiments of the present invention.

Embodiments of the present invention, as well as environments utilized therewith, are now shown with regard to FIG. 2. In various embodiments, this figure is envisioned to encompass one or more computer environments, as well as components thereof and i/o devices associated therewith. These computer environments can be single or multiple-user environments, and can utilize one or more processors. In addition, the computer environments can pertain to microcomputers/workstations, minicomputers, mainframes and massively parallel processing computers. Examples of microcomputers/workstations include the IBM PC manufactured from IBM Corporation of Armonk, N.Y., and the Sparc-Station from Sun Microsystems of Mountain View, Calif.; Examples of minicomputers are the VAX 750 from Digital Equipment Corporation of Maynard, Mass. and the AS/400 from IBM Corporation; an example of a mainframe is the System-390 series from IBM; and an example of a massively parallel processing computer is the Cray T3D from Cray Research of Eagan, Minn. Of course, any number of other types of computer systems are also contemplated for use with the present invention. Also, the present invention contemplates that two or more of such computer environments can be linked and used together.

In addition, any number of operating systems can be used with regard to the computer environment used with the present invention, including any of the various versions of Unix, VMS from Digital Equipment, OS/2 from IBM and/or DOS or Windows from Microsoft Corporation of Redmond, Wash.

Referring now to FIG. 2, the dynamic adaptation mechanism 102 is shown to reside in a memory/storage device 208. Embodiments of the present invention contemplate that the memory/storage device 208 could be any number of different types of computer-readable mediums for storing information, including RAM memory, magnetic, electronic, atomic or optical (including holographic) storage, some combination thereof, etc.

Memory/storage 208 is in communication, via communication link 110, with one or more CPU(S) 202. Embodiments of the present invention contemplate that the CPU(S) 202 can be those typically found in the computers mentioned above, or they can be any number of other types of CPU(s). For example with regard to microcomputers, any of the Intel 80X86 series, Pentium or any other CPU developed in Intel's future line of CPUs are contemplated. In addition, user input device 106 and user output device 108 are also shown to be in communication with CPU(s) 202 and memory/storage 208.

Embodiments of the present invention contemplate that memory/storage 208 could be at a "remote" location, such as at the head-end of a cable television system (where television paradigms are concerned) or at an application server node (where internet/on-line paradigms are concerned). In either of those situations, communication link 110 might then be, for example, a telephone or cable communications link. In addition, CPU(s) 202 could also exist at that remote location (although one would also likely exist at the user's "local" location as well). In other embodiments contemplated by the present invention, all components shown by FIG. 2 can reside locally at the user's location. In that case, however, dynamic adaptation mechanism 102 would need to be updated by some external scheme so that the database of available items can be obtained and kept current. In addition, communication link 110 might be a local communications entity such as a computer bus.

Within the dynamic adaptation mechanism 102 shown in FIG. 2 is depicted various features contemplated by embodiments of the present invention. One of the features contemplated is a Knowledgebase 214. This knowledgebase 214 generally is envisioned to be the database mentioned above, but more specifically contemplates a categorized list of the items in the choice space available to the user. For example, in the television paradigms, pre-defined categories of television items can include news, science fiction, comedies, etc. Such general categories can, in turn, be divided even further, as desired.

Another envisioned feature of dynamic adaptation mechanism 102 is the creation and use of one or more category interest vectors 210. A category interest vector 210 is used to track the categories of items in the choice space that a user (or entity such as a "household") has shown interest in. By looking at a category interest vector 210 for a particular user, other items of potential interest can then be suggested to the user. Also, it should be noted that by assigning one or more category interest vectors 210 to a particular user, the particular interests of each individual user can be kept track of within a potentially multi-user environment.

It should be understood, however, that while embodiments of the present invention contemplate the use of category interest "vectors," that any number of memory schemes (e.g., a "category interest structure" of some type) other than vectors can also be used. It should also be understood that the present invention can also be utilized so that user "preferences" as recorded by the category interest vectors 210 can represent a user's "dislikes." In that situation, those category interest vectors 210 would be used to assist a user to avoid certain items in the choice space.

Embodiments of the present invention also contemplate utilizing one or more history lists 212 (or some type of history "structure"). Again using television paradigms as an example, the history lists 212 keep track of such information as the point in time (e.g., the date) that a particular program was watched by a user, the length of the program at issue, and/or the actual length of time that the user was watching the program for. This allows information that was entered into a category interest vector 210, prior to, e.g., some chosen date, to be removed. In this way, the information in the category interest vector 210 is kept current so that it can reflect the changing interests of a particular user over a period of time.

It should be understood that the configuration of the various aspects of the present invention depicted by FIG. 2 are by way of example, and at the present invention contemplates any number of different configurations and/or different components.

Figure 3:
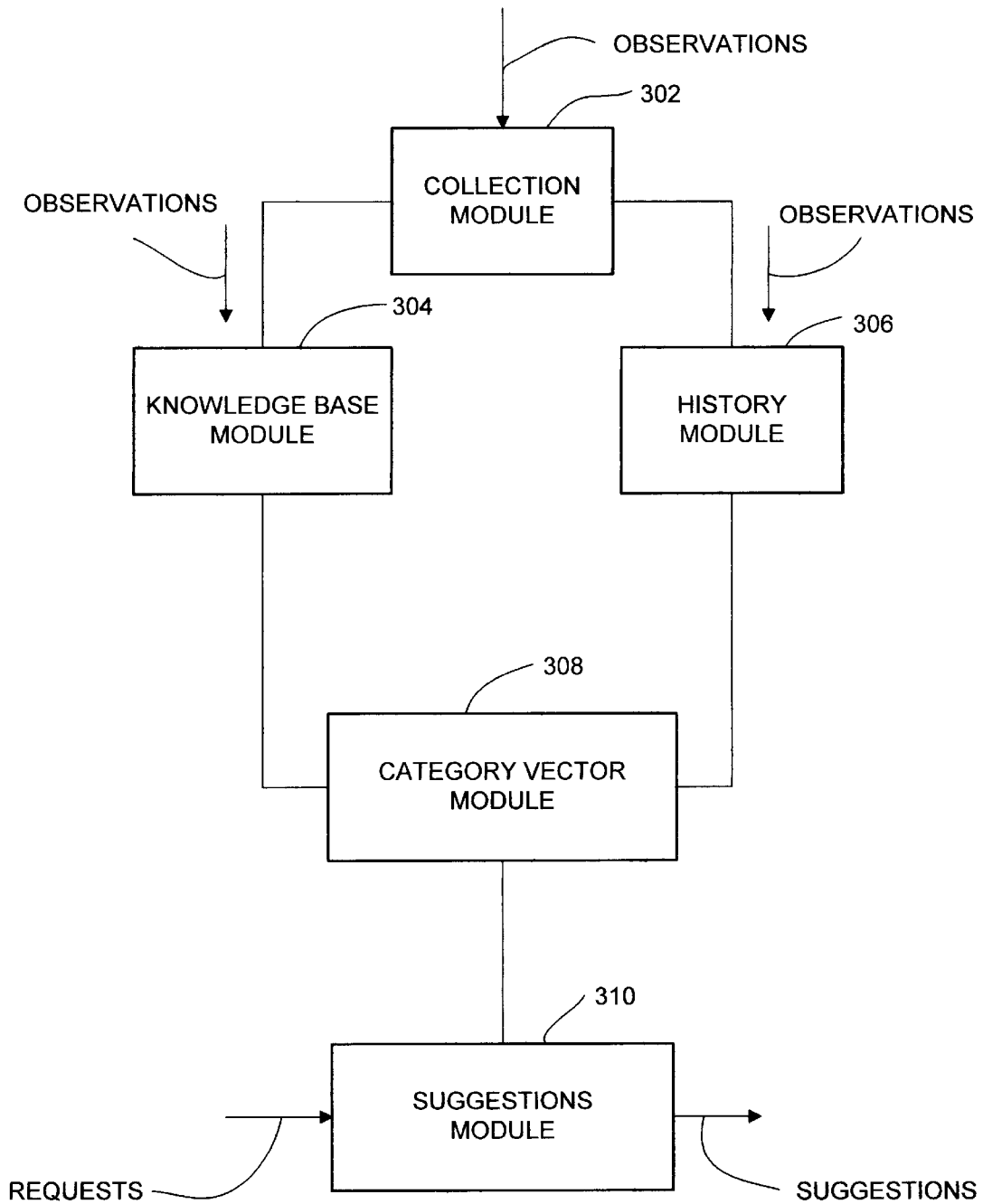
FIG. 3 is a block diagram of various modules contemplated by embodiments of the present invention.

Embodiments of the present invention contemplate that the dynamic adaptation mechanism 102 can be viewed as comprising various functional modules. These modules are now described with regard to FIG. 3. Referring to FIG. 3, a collection module 302 is shown, which is responsible for receiving observations from the user (via, e.g., communication link 110). Thus, this module 302 can serve as the interface between the dynamic adaptation mechanism 102 and any incoming observations. In a multi-user environment, part of the information associated with this observation would indicate the particular user that the observation came from. Also, embodiments of the present invention contemplate that collection module 302 would be responsible for receiving any explicit information that the user enters, although other embodiments also envision that the explicit information could be received by another entity as well.

Once an observation is received by collection module 302, it is contemplated that it is then communicated to knowledgebase module 304. It is envisioned that knowledgebase module 304 contains (or otherwise has access to) knowledgebase 214. In this way, when the observations are received, the associated category to which the observation belongs can be identified. Explicit information entered by a user can also be so identified by the knowledgebase module 304.

Once the category of the observation (or explicit information) has been identified by the knowledgebase module 304, pertinent category information is then received by category vector module 308. Embodiments of the present invention contemplate that category vector module 308 contains (or otherwise has access to) one or more category interest vectors 210. The received category information, which may be accompanied by a time-related value associated with the observation (e.g., a program watched for 20 minutes may have a value of 20 units associated with it) is used to update the user's category interest vector 210. For example, in television paradigms, an observation that a user watched 20 minutes of the program Seinfeld might cause a "comedy" portion of the user's category interest vector to be updated by 20 units. A history module 306 also receives observations from collection module 302. History module 306 contains (or otherwise has access to) one or more history lists 212, which keep track of when observations are received. As indicated above, this information can be used to keep a user's category interest vector 210 current.

A suggestions module 310 is used to suggest other items to a user based upon the information associated with category vector module 308. Specifically, a request (either initiated, e.g., periodically, by the occurrence of an event, or by a user) is received, and the applicable information within the user's category interest vector 210 is analyzed. Then, one or more suggestions are made to the user based upon the information associated with the category vector module 308. These suggestions can be passive (e.g., small icons are displayed on the user's display, indicating the availability of these other items) or else they could be "active," where the content associated with the suggestions is automatically forwarded to the user for display at user input device 106.

It should be understood that the various modules mentioned in FIG. 3 are by way of example, and that various other configurations and components are also contemplated by the present invention. It should also be understood that various embodiments of the present invention envision that the function of one or more of the modules mentioned above can be performed by entities external to the dynamic adaptation mechanism 102.

Figure 4:
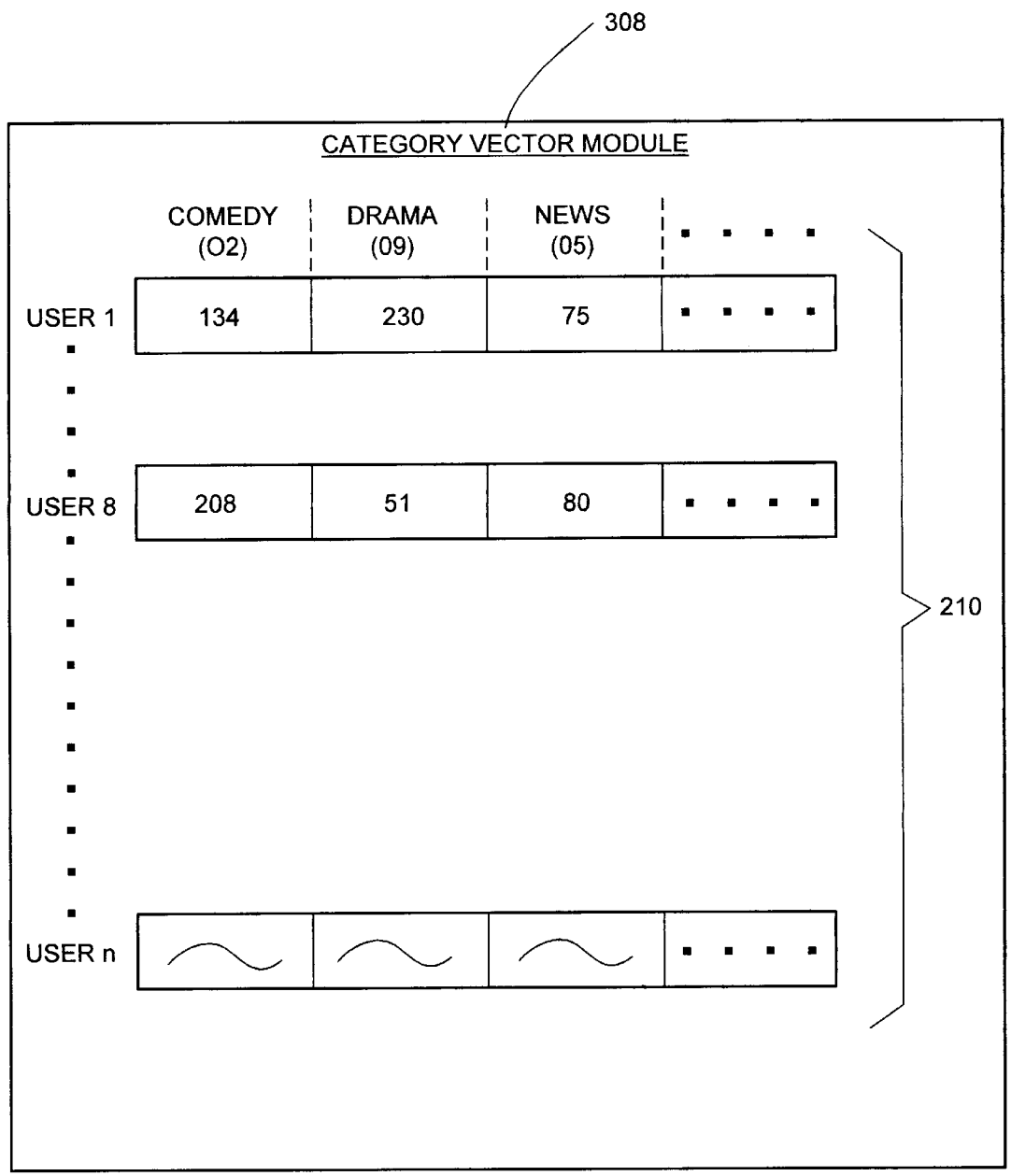
FIG. 4 is a diagram of a category vector module depicting an example of category interest vectors as envisioned by embodiments of the present invention.
Figure 5:
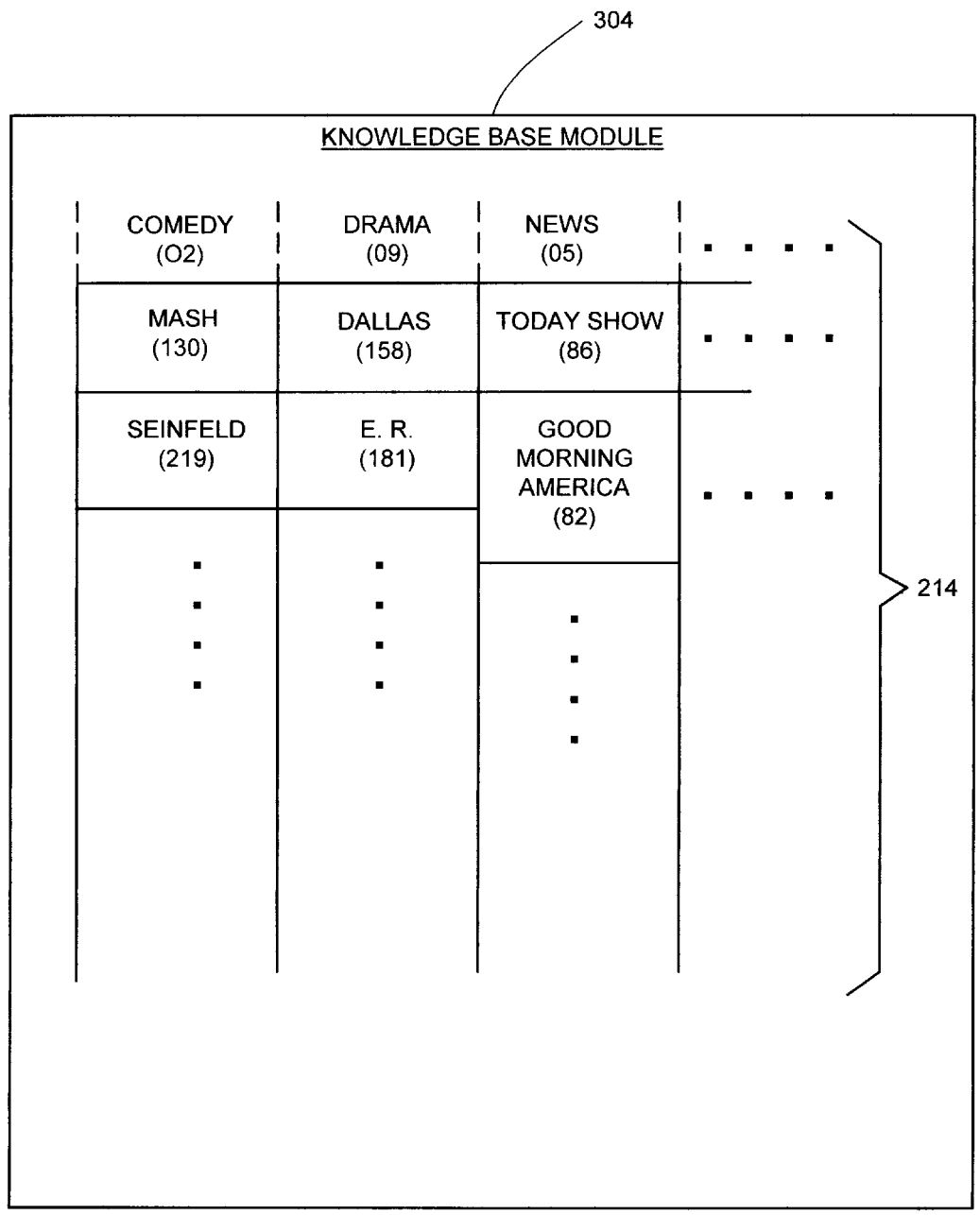
FIG. 5 is a diagram of a knowledgebase module depicting an example of a knowledgebase as envisioned by embodiments of the present invention.
Figure 6:
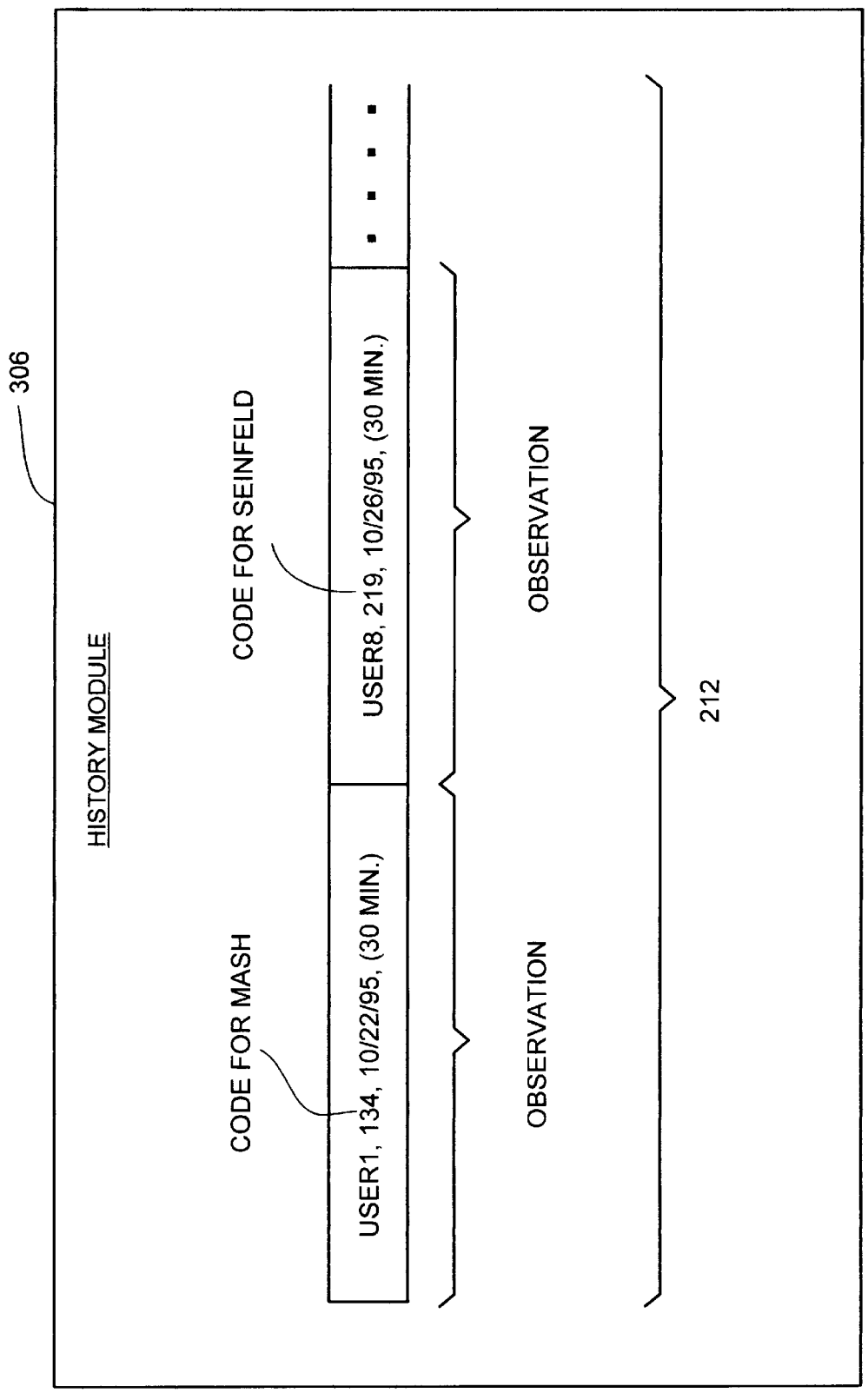
FIG. 6 is a diagram of a history module depicting an example of a history list as envisioned by embodiments of the present invention.

Various specific implementations contemplated by embodiments of the present invention are now shown with regard to FIGS. 4–6. In these Figures, television paradigms are used by way of example although, again, it should be understood that any number of different paradigms are envisioned by the present invention.

Referring first to FIG. 4, a diagram of the category vector module 308 is shown. Within the module 308 are shown a number of category interest vectors 210, each associated with a particular user (or entity, such as a household). As can be seen, each category interest vector is divided into categories (corresponding to the pre-defined categorization of the available choice space). Thus, as shown in this example, each category interest vector has a category entry for comedies, dramas, and news. The dotted lines at the end of each vector indicate that any number of other categories (and sub-categories) are also contemplated.

In various embodiments contemplated by the present invention, it is envisioned that each of the categories of the category interest vectors 210 can have a numerical value associated with it. Thus, in the example depicted by FIG. 4, the comedy category has a value of 02, drama 09, and news 05. This, e.g., facilitates numerical representation of the categories for computer-related purposes. of course, it should be understood that other identifying criteria, such as the ascii values of the names of the categories themselves, could also be used.

The numbers shown within each of the category interest vector entries represent the preferences that each user has given (explicitly or by actual observation) to a particular category. Embodiments of the present invention contemplate that these numerical preferences are related to the amount of time for which a user has watched programs in a particular category and to explicit preferences entered, although other measurement criteria are also contemplated. Thus, for example, User 1 has watched and/or explicitly entered a total of 134 units of comedy, 230 units of drama, and 75 units of news.

The way that the category interest vector 210 might be used, as contemplated by various embodiments of the present invention, is as follows. Preferably (but not necessarily) before a user first begins to select items from a given choice space, the user enters explicit information indicating his or her preference for certain categories. This could be in the form of entering specific television programs that they enjoy watching, and/or entering or selecting the names of the categories themselves. If specific television programs are entered, then the appropriate categories of the programs are subsequently ascertained by the present invention (as explained below). In any event, a certain number of units would be assigned to the explicit preferences, and these units would be entered into the appropriate entries of the user's category interest vector.

In addition to explicit information, observations also affect the values of a user's category interest vector 210. Thus, for example, a user watching a certain amount of, e.g., the program Seinfeld, will cause the comedy category entry to be incremented by some representative number of units. The number of units might represent the duration of the entire show (possibly, for example, assuming that the user watched some pre-defined percentage of it), the actual amount of time the show was watched, etc.

At various times or at the explicit request of a user (as will be discussed further below) other items within the choice space will be suggested to the user, based upon the information within the user's particular category interest vector. For User 1, for example, the entries indicate a preference for drama. Thus, programs in the "drama" category in knowledgebase 214 would be looked at to suggest other items to User 1.

Presentation of these suggested items to User 1, as mentioned above, could be done in any number of ways. For example, embodiments of the present invention contemplate that User 1 could be presented with a list of dramas that he or she has never watched, dramas that have appeared in the knowledgebase only after a pre-defined date or within a pre-defined range of dates, etc. For embodiments contemplating that choice space items can be cross referenced into multiple categories, another criteria might be that the dramas presented also be cross referenced within another category having a relatively high category interest vector ranking. In fact, any number of different criteria can be used to suggest items to the user within the appropriate category. In addition, the suggestions can come from the top n preferred categories, as opposed to just the user's single most preferred category. Thus, for example, if n=2, then the suggestions presented to User 8 would be taken from the comedy and news categories, with a greater emphasis being placed on comedies.

FIG. 5 shows an example of the knowledgebase module 304 and of knowledgebase 214 itself. Referring now to FIG. 5, the categories of comedy, drama, and news are shown, along with example television programs in each category. Embodiments of the present invention contemplate that each of the programs has a numeric value associated with it. This can assist in the overall categorization process, although it should be understood that other identifying criteria, such as the ascii values of the names of the television programs themselves, could also be used.

Embodiments of the present invention contemplate that the items within the choice space will be in some type of categorizable form. The categorizing itself can be done by the provider of the items of information and/or by the users themselves, and/or by any entity within the items' distribution chain. In any event, the categorization is envisioned to be done based upon the choice space items. In the example of FIG. 5, the items were categorized into comedy, drama and news categories. It should be understood, however, that the example of the knowledgebase 214 shown in FIG. 5 is by way of example, and that any number of different categorization schemes (even for the same items) are contemplated. In any event, where a user has indicated a preference for a particular category (e.g., drama), the present invention will suggest items from the knowledgebase 214 in that category to the user.

In addition to the information shown in FIG. 5, each item in knowledgebase 214 might have additional information associated with it, such as the date when the item first appeared in the knowledgebase 214, the date that the item was last accessed by a user, etc. This information can then be used to determining whether certain information from within a "preferred" category should be suggested to the user. Thus, embodiments of the present invention contemplate that there can be two different levels of selecting an item for "suggestion" to a user. The first one is based upon the weight given to the categories within category interest vectors 210 (as mentioned above) and the second is based upon other criteria within a particular, preferred category. For example, where drama is a preferred category (by virtue of analyzing the category interest vectors 210), only those dramas never before watched by the user may be the ones suggested to the user.

It should also be understood that the categories can be separated unto any number of sub-categories. For example, the "comedy" category can be divided up into further categories such as "sit-coms," "variety shows," etc.

A history module, as contemplated by embodiments of the present invention, is now discussed with regard to FIG. 6. As indicated above, the history module 306 keeps the category interest vector 210 current so that it can adapt to a user's preferences that may change over time. Referring now to FIG. 6, history list 212 is shown to be made up of the observations that are received by the dynamic adaptation mechanism 102. Although a single "list" is depicted for all users, embodiments also envisioned situations where each user has his or her own list.

In the current example shown by FIG. 6, it is shown that User 1 was watching Mash (designated by a code 130) on Oct. 22, 1995. Also indicated is the length of the show (30 minutes). Embodiments of the present invention contemplate that the observation will be recorded only when the user has watched the program for some pre-defined amount of time (e.g., for at least 80% of those 30 minutes). However, embodiments of the present invention also contemplate that the actual amount of time that the user was watching the program can be recorded (e.g., 21 minutes), and that this observation will not be recorded unless the program was watched for a certain percent of its total duration. Of course, other schemes for indicating the amount of time watched are also contemplated.

The way that the history module 306 and, in particular, the history list 212 can be utilized is that, by the occurrence of some designated event (for example, at some predetermined time period such as the beginning of every week or every month, and/or at a user's request) the history list 212 is scanned to identify any observations that were made at a point in time prior to some specified time period such as some specified date (wherein the specified time period can be determined automatically, by a user, etc.). For example, if that specified date is Oct. 24, 1995, then the observation indicating that User 1 watched Mash would be identified. Using knowledgebase 214, this particular observation would be determined as relating to a comedy, and the "comedy" entry of User 1's category interest vector would be offset (e.g., decremented) by some amount (e.g., 30 units worth, representing the 30 minutes of Mash). The pertinent observation in the history list 212 would also get deleted.

By utilizing the history list 212 as mentioned above, entries in the category interest vector 210 which resulted from television programs watched significantly long ago can be removed to make way for entries resulting from more recently watched programs. This keeps the category interest vector 210 for a given user more in accord with the user's current preferences.

It should, of course, be understood that the scheme depicted in FIG. 6 is by way of example, and that the present invention contemplates any number of different schemes by which historical data can be maintained and utilized to adjust the category interest vector 210. Also, as stressed above, the concepts set forth with regard to FIGS. 4–6 are applicable to any number of other paradigms. For example, in internet/on-line paradigms contemplating a web site choice space, the categories of the knowledgebase 214 might relate to the primary type of information located at the site (e.g., astronomy, web site search tools, ticket purchases, etc.). In addition, it should be understood that in embodiments of the present invention, the various modules mentioned above may contain various facilities to help update and maintain any lists, vectors, etc. that may be present within the modules.

Figure 7:
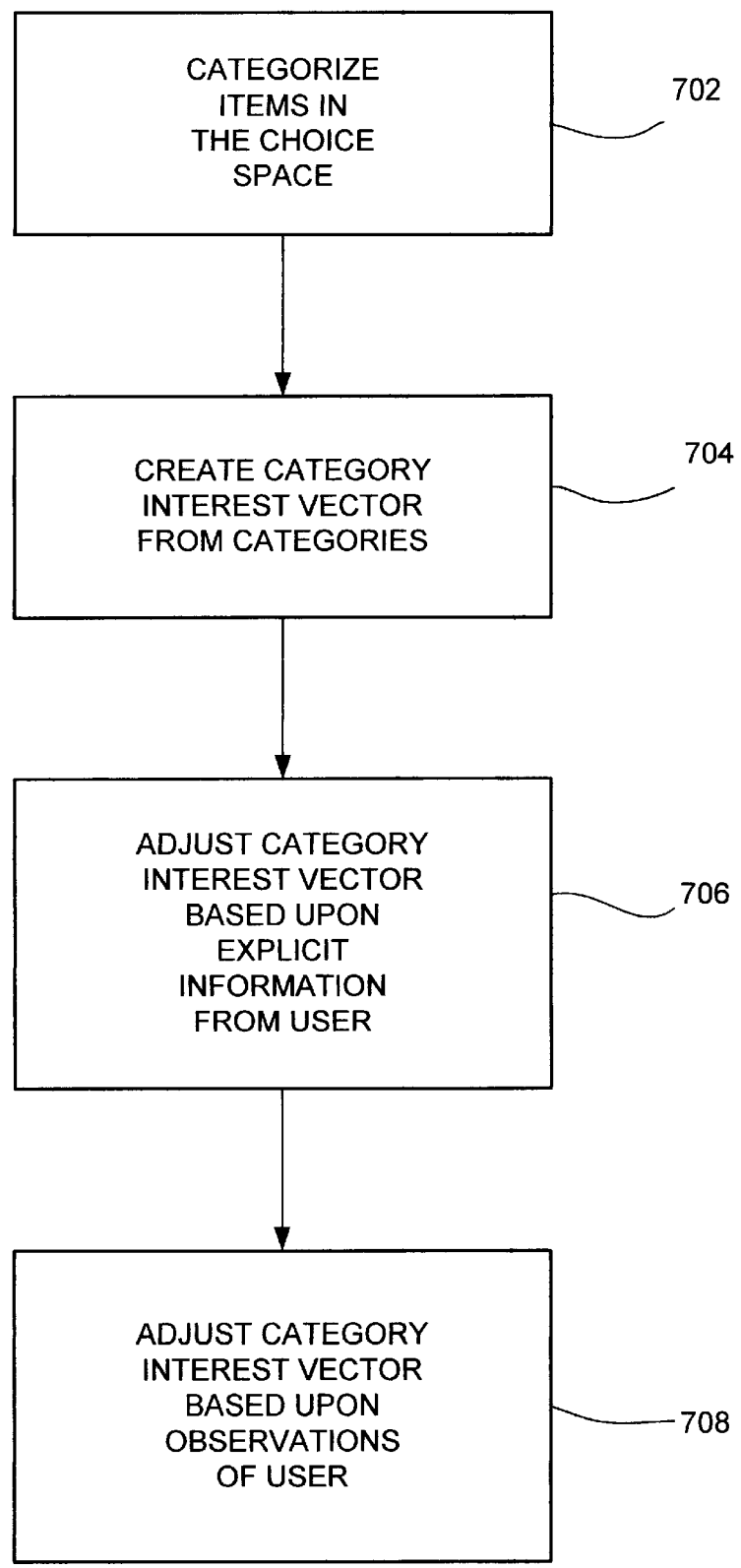
FIG. 7 is a flow diagram of a method contemplated by embodiments of the present invention for preparing and maintaining a category interest vector.

A process contemplated by embodiments of the present invention for preparing and maintaining the one or more category interest vectors 210 for use (in suggesting items to a user) is now described with regard to FIG. 7. For simplicity, FIGS. 7 and 8 will be described as though relating to a single-user, although it should be understood that the concepts to be described also relate to multi-user schemes.

Referring now to FIG. 7, the first step is to categorize the choices in the choice space, as indicated by a block 702. Based upon these categories, a category interest vector 210 is created, as indicated by a block 704.

After these steps occur, the category interest vector 210 is adjusted based upon explicit information from the user, as indicated by a block 706. Then, the next step is to adjust the category interest vector based upon actual observations of the user, as indicated by a block 708. In this way, the category interest vector 210 is first initialized, and then is adjusted over time based upon actual observations of the user. In various embodiments of the present invention, keeping the category interest vector 210 current is assisted by the use of the history list 212 (as mentioned above). It should be noted, however, that embodiments of the present invention contemplate that the information explicitly entered by a user can be entered at any time (e.g., after observations have been recorded) in order to accelerate the process of adjusting the category interest vector to reflect new preferences of the user. Also, various embodiments of the present invention (e.g., in certain internet/on-line paradigms such as those relating to the world wide web) envision that explicit information need not be required from the user, and that the category interest vector only reflect the observations of the user.

Figure 8:
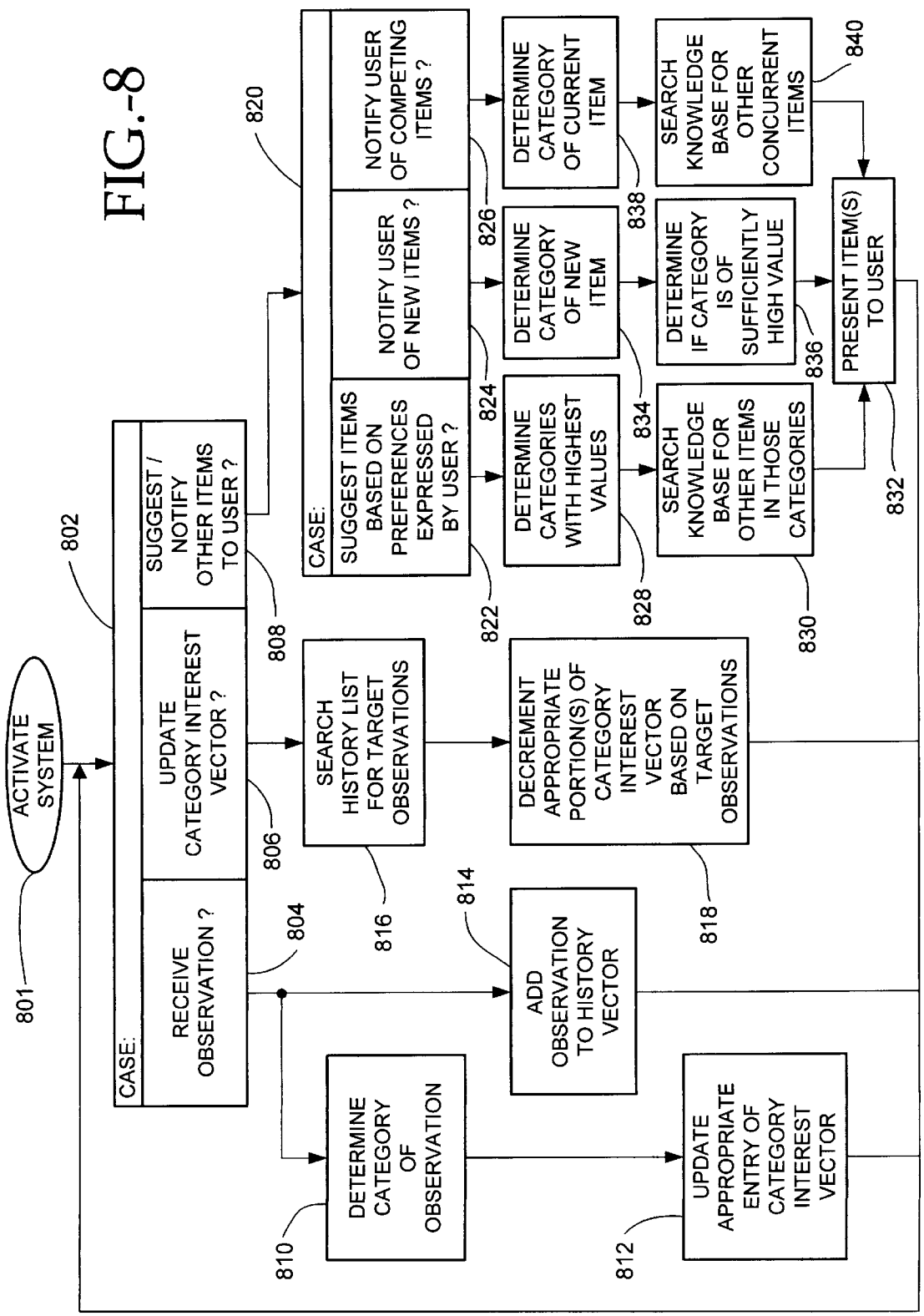
FIG. 8 is a flow diagram of a method contemplated by embodiments of the present invention relating to the occurrence of certain events.

A process contemplated by embodiments of the present invention for responding to certain events pertaining to the dynamic adaptation mechanism 102 is now described with regard to FIG. 8. Referring to FIG. 8, the first step is to activate the relevant system, as indicated by a block 801. This would be the activation of the local and, if applicable, remote portions of the system. For example, in internet/on-line paradigms, this might be the activation of the user's computer and, if applicable, the remote application server node. Of course, it should be understood that the present invention also contemplates environments where the relevant system is always on.

Once the system is activated (or on), various events may occur, as indicated by a case block 802. One event is receipt of an observation, as indicated by a block 804. When this occurs, embodiments of the present invention contemplate that the category of the observation is determined, as indicated by a block 810. Thus, in television paradigms, a determination is made whether, for example, the program being watched by a user is a comedy, a drama, etc. Once this determination has been made, the appropriate category entry of the category interest vector 210 is updated, as indicated by a block 812.

Also upon receiving the observation, the observation is added to the history list 212, as indicated by a block 814.

Embodiments of the present invention also contemplate that the receipt of explicit information from a user can be handled in a similar manner to that of the received observations described above.

Another event that may occur is an indication that the category interest vector 210 should be updated, as indicated by a block 806. As mentioned above, this would involve a situation where it is desirable to reduce entries in the category interest vector 210 resulting from observations occurring prior to a specified date by an amount related to those observations. When this occurs, the first step is to search the history list 212 for the appropriate target observations (i.e., those observations made prior to the specific date), as indicated by a block 816. The appropriate category entries of the category interest vector 210 would be decremented (or in some way offset) based upon the target observations that were found, as indicated by a block 818. Thus, for example, if 100 units of comedy were found to be in the category interest vector as a result of observations occurring prior to the specific date, then the comedy category would be decreased by, for example, 100 units.

Another event that may occur concerns the suggestion or notification of other items within the choice space that may be of interest to the user, as indicated by a block 808. Embodiments of the present invention envision a number of different schemes for doing this, as indicated by a case block 820. One scheme is to generally suggest items to the user based upon the user's previously-expressed preferences, as indicated by a block 822. The present invention envisions any number of techniques for activating this. One technique, for example, is to allow the user to explicitly indicate that he or she would like to see other items in the choice space that might be of interest, based upon preferences reflected in the category interest vector 210. Another technique is to automatically make suggestions at given time intervals.

Regardless of which of the above-mentioned techniques is used, the next step is to determine which categories in the user's category interest vector would have the highest values, as indicated by a block 828. Then, a search of the knowledgebase 214 for other items in those categories occurs, as indicated by a block 830. As indicated above, the items in those categories with the highest values can be further filtered using any number of other criteria.

Once the items from the choice space are obtained as per block 830, they are then presented to the user, as indicated by a block 832. The present invention contemplates any number of different ways to present this information to the user, such as in list format, icon format, etc.

Another scheme to suggest/notify the user of other items as per case block 820 is to notify the user of any new items that appear in the choice space (and that may be of interest), as indicated by a block 824. This would occur in television paradigms, for example, when a new program is first introduced. Again, this can be initiated either automatically or by explicit request from the user. Either way, a determination of the category of the new item is made, as indicated by a block 834. Then, a determination is made to see if the category is of a sufficiently high value within the category interest vector 210 to warrant the user's attention, as indicated by a block 836. If it is, then the item is presented to the user, as indicated by block 832.

Another scheme contemplated by the present invention for suggesting or notifying the user of other items is to notify the user of items that may be competing with what he or she is currently viewing, as indicated by a block 826. Again, this could be activated automatically or by specific request. In either case, a determination of the category of the current item being viewed is made, as indicated by a block 838. A search within the knowledgebase 214 for other concurrent items within that category is then made, as indicated by a block 840. Thus, for example, if a user is watching a comedy on television, an icon indicating that another comedy that is currently on another channel can appear on the screen. In any event, the selected items are in some way presented to the user, as indicated by block 832. It should be noted that, again, in this situation, within the category or categories of items having the highest preference values, other selection criteria can also be established.

It should be understood that the schemes discussed with regard to FIGS. 7 and 8 are by way of example, and that the present invention also contemplates other schemes and techniques for implementing the general concepts therein.

In general, it should be emphasized that the various components of embodiments of the present invention can be implemented in hardware, software or a combination thereof. In such embodiments, the various components and steps would be implemented in hardware and/or software to perform the functions of the present invention. Any presently available or future developed computer software language and/or hardware components can be employed in such embodiments of the present invention. For example, the various modules and structures mentioned above could be implemented using the C or C++ programming languages. It is also to be appreciated and understood that the specific embodiments of the invention described hereinbefore are merely illustrative of the general principles of the invention. Various modifications may be made by those skilled in the art consistent with the principles set forth hereinbefore.

What is claimed is:

1. A computer-implemented method for providing a suggested item to a user based upon explicit input by and observations of the user, the suggested item being taken from choice space items available to the user, wherein at least some of the choice space items are associated with one of two or more categories created based upon the choice space items, the method comprising the steps of:

(1) receiving, from a user, explicit input indicating a preference for one or more of the two or more categories;

(2) observing when one or more choice space items are actually accessed by the user and associating each of said one or more accessed choice space items with at least one of the two or more categories;

(3) weighting the two or more categories based upon said explicit input of said step (1) and based upon said observing of said step (2);

(4) suggesting, to the user, the suggested item from the choice space, wherein the suggested item is chosen from at least one of the two or more categories having at least a pre-defined weight, said step (4) comprising the step of utilizing a category interest structure, wherein said category interest structure comprises two or more entries corresponding to said two or more categories of said step (1); and (5) updating an entry within said category interest structure corresponding to said one or more choice space items actually accessed by the user, wherein said step (2) comprises the step of recording the point in time that each of said accessed choice space items is observed, wherein, by the occurrence of a designated event, each of said two or more entries of said category interest structure is offset by an amount corresponding to accessed choice space items observed prior to a specified time period.

2. The method of claim 1, further comprising the step of updating an entry within said category interest structure corresponding to said explicit input of said step (1).

3. The method of claim 2, wherein said explicit input contains a reference to at least one of the two or more categories.

4. The method of claim 1, wherein said step (4) comprises the step of receiving an indication from the user as to when the suggested item should be suggested to the user.

5. The method of claim 1, wherein said step (4) comprises the step of periodically suggesting at least one suggested item in the choice space to the user.

6. The method of claim 1, wherein said step (4) comprises the step wherein the suggested item is chosen based upon additional criteria.

7. The method of claim 6, wherein said additional criteria comprises that the user has not previously selected the suggested item.

8. The method of claim 6, wherein said additional criteria comprises that the suggested item is available to the user concurrently with a current item being accessed.

9. The method of claim 1, wherein the observations and explicit input are received from at least two users,
  wherein each of the at least two users has an associated category interest structure.

10. The method of claim 9, wherein the point in time that each of said accessed choice space items of said step (2) is observed is recorded for each of the at least two users,
  wherein, by the occurrence of a designated event, each of said two or more entries of a category interest structure for at least one of said at least two users is offset by an amount corresponding to accessed choice space items observed prior to a specified time period.

11. A machine for providing a suggested item to a user based upon explicit input by and observations of the user, wherein the suggested item is taken from choice space items available to the user, comprising:
  a knowledgebase containing a list of the choice space items, wherein the list is divided into two or more categories;
  a collection module for receiving observations from the user, wherein each of said observations indicates an accessed choice space item actually accessed by the user,
    said collection module also for receiving explicit input from the user indicating user preference concerning the choice space items,
    wherein said accessed choice space item and said explicit input are associated with one of said two or more categories of said knowledgebase;
  a category interest structure, wherein said category interest structure is divided into two or more category entries corresponding to said two or more categories of said knowledgebase,
    wherein said category entries are weighted in accordance with said accessed choice space item and said explicit input;
  a suggestions module, wherein said suggestions module presents the suggested item from the choice space to the user, wherein the suggested item is chosen from one of said two or more categories having a corresponding category entry of at least a pre-defined weight, and;
  a history structure, wherein said history structure contains information associated with the observations of the user, including the point in time that the observations were made,
  wherein, by the occurrence of a designated event, each of said two or more entries of said category interest structure is offset by an amount corresponding to observations made prior to a specified time period.

12. The machine of claim 11, wherein the observations and explicit input are received from two users,
  wherein each of the two users has an associated category interest structure.

13. The machine of claim 12, wherein said history structure contains information associated with the observations of each of the two users, including the point in time that each of the observations were made,
  wherein, by the occurrence of a designated event, each of said two or more entries of a category interest structure for at least one of said two users is offset by an amount corresponding to observations made prior to a specified time period.

14. The machine of claim 13, wherein each observation contains an indication of:
  (a) which one of the two users the observation was received from; and
  (b) the date upon which said accessed choice space item was accessed by said one of the two users.

15. The machine of claim 14, wherein each observation contains an amount of time said one of said two users accessed said accessed choice space item.

16. The machine of claim 15, wherein a category entry of a category associated with said accessed choice space item is incremented by an amount representative of said amount of time,
  wherein, upon the occurrence of said designated event, said category entry of said category associated with said accessed choice space item is decremented by an amount representative of said amount of time.

17. The machine of claim 11, wherein each observation contains an amount of time the user accessed said accessed choice space item, and wherein a category entry of a category associated with said accessed choice space item is incremented by an amount representative of said amount of time.

18. The machine of claim 11, wherein said list in said knowledgebase represents choice space items having a specified duration, wherein a category entry of a category associated with said accessed choice space item is incremented by an amount representative of a specified duration corresponding to said accessed choice space item.

19. The machine of claim 18, wherein said category entry is incremented by said amount upon a determination that the user accessed said accessed choice space item for a pre-defined percentage of said specified duration.

20. The machine of claim 11, wherein the suggested item from said two or more categories is chosen based upon at least one of the following additional criteria:
  (a) the user has not previously accessed said suggested item;
  (b) said suggested item appeared in said knowledgebase within a pre-defined range of dates;
  (c) said suggested item is referenced in at least two of said two or more categories each having a corresponding category entry of at least a pre-defined weight;
  (d) said suggested item is available to the user concurrently with a current item being accessed.

21. The machine of claim 11, wherein the suggested item is presented to the user upon receipt of an indication from the user to present the suggested item.

22. The machine of claim 11, wherein the suggested item is periodically presented to the user.

23. A computer-readable medium for use with a computer, wherein said computer-readable medium allows a suggested item to be provided to a user based upon explicit input by and observations of the user, wherein the suggested item is taken from choice space items available to the user, wherein the choice space items are divisible into two or more categories, comprising:
  reception means for receiving, from a user, explicit input indicating a preference for one or more of the two or more categories;

observation means for receiving an observation indicating that one or more choice space items were actually accessed by the user and for associating each of said one or more accessed choice space items with at least one of the two or more categories;

weighting means for weighting said two or more categories based upon said explicit input of said reception means and based upon said observation of said observation means;

suggestion means for presenting, to the user, the suggested item from the choice space, wherein the suggested item is chosen from said two or more categories having at least a pre-defined weight as determined by said weighting means, wherein said weighting means comprises a category interest structure, wherein said category interest structure comprises two or more category entries corresponding to said two or more categories, and means for updating a category entry within said category interest structure corresponding to said explicit input, wherein said observation means records the point in time that each of said accessed choice space items is observed, and wherein, by the occurrence of a designated event, each of said two or more entries of said category interest structure is offset by an amount corresponding to accessed choice space items observed prior to a specified time period.

24. The computer-readable medium of claim 23, wherein the suggested item is presented to the user upon receipt of an indication from the user to present the suggested item.

25. The computer-readable medium of claim 23, wherein the suggested item is periodically presented to the user.

26. The computer-readable medium of claim 23, further comprising means for updating a category entry within said category interest structure corresponding to said one or more accessed choice space items.

27. The computer-readable medium of claim 23, wherein the suggested item from the two or more categories is chosen based upon at least one of the following additional criteria:

(a) the user has not previously accessed the suggested item;

(b) the suggested item appeared as one of the choice space items within a pre-defined range of dates;

(c) the suggested item is referenced in at least two of said two or more categories each having a corresponding category entry of at least a pre-defined weight;

(d) the suggested item is available to the user concurrently with a current item being accessed.

28. The computer-readable medium of claim 23, wherein the observations and explicit input are received from two users, wherein each of the at least two users has an associated category interest structure.

29. The computer-readable medium of claim 28, wherein the point in time that each of said accessed choice space items is observed is recorded for each of the at least two users, wherein, by the occurrence of a designated event, each of said two or more category entries of a category interest structure for at least one of the two users is offset by an amount corresponding to accessed choice space items observed prior to a specified time period.

30. A machine for providing a suggested item to a user based upon explicit input by and observations of the user, wherein the suggested item is taken from a choice space of items available to the user, comprising:

a knowledgebase containing a list of choice space items, wherein said list is divided into two or more categories;

a user input device for allowing a user to enter the explicit input, thereby indicating a preference for at least one of said two or more categories said user input device also for allowing the user to choose choice space items for accessing;

a communication link for transmitting the explicit input and observations to a collection module;

said collection module for receiving observations from the user, wherein each of said observations indicates an accessed choice space item actually accessed by the user, said collection module also for receiving explicit input from the user indicating user preference relating to the items in the choice space, wherein said accessed choice space item and said explicit input are associated with one of said two or more categories of said knowledgebase;

a category interest structure, wherein said category interest structure is divided into category entries corresponding to said two or more categories of said knowledgebase, wherein said category entries are weighted in accordance with said accessed choice space item and said explicit input;

a suggestions module, wherein said suggestions module presents the suggested item from the choice space to the user, wherein the suggested item is chosen from one of said two or more categories having a corresponding category entry of at least a pre-defined weight; and a history structure, wherein said history structure contains information associated with the observations of the user, including the point in time that the observations were made, wherein, by the occurrence of a designated event, each of said two or more entries of said category interest structure is offset by an amount corresponding to observations made prior to a specified time period.

31. The machine of claim 30, wherein said communication link is at least a part of a cable or telephone transmission system.

32. The machine of claim 30, wherein said communication link is at least a part of a computer bus.

33. The machine of claim 30, wherein the observations and explicit input are received from two users, wherein each of the two users has an associated category interest structure.

34. The machine of claim 33, further comprising a history structure, wherein said history structure contains information associated with the observations of each of the two users, including the point in time that each of the observations were made, wherein, by the occurrence of a designated event, each of said two or more entries of a category interest structure for at least one of said two users is offset by an amount corresponding to observations made prior to a specified time period.

35. The machine of claim 34, wherein each observation contains an indication of:

(a) which one of the two users the observation was received from; and (b) the date upon which said accessed choice space item was accessed by said one of the two users.

36. The machine of claim 35, wherein each observation contains an amount of time said one of said two users accessed said accessed choice space item.

37. The machine of claim 36, wherein a category entry of a category associated with said accessed choice space item is incremented by an amount representative of said amount of time, wherein, upon the occurrence of said designated event, said category entry of said category associated with said accessed choice space item is decremented by an amount representative of said amount of time.

38. The machine of claim 30, wherein said list in said knowledgebase represents choice space items having a specified duration, wherein a category entry of a category associated with said accessed choice space item is incremented by an amount representative of a specified duration corresponding to said accessed choice space item.

39. The machine of claim 38, wherein said category entry is incremented by said amount upon a determination that the user accessed said accessed choice space item for a pre-defined percentage of said specified duration.

40. The machine of claim 30, wherein the suggested item from said two or more categories is chosen based upon at least one of the following additional criteria:

(a) the user has not previously accessed said suggested item;

(b) said suggested item appeared in said knowledgebase within a pre-defined range of dates;

(c) said suggested item is referenced in at least two of said two or more categories each having a corresponding category entry of at least a pre-defined weight;

(d) said suggested item is available to the user concurrently with a current item being accessed.

41. The machine of claim 30, wherein the suggested item is presented to the user upon receipt of an indication from the user to present the suggested item.

42. The machine of claim 30, wherein the suggested item is periodically presented to the user.

43. A computer-implemented method for providing a suggested item to a user based upon observations of the user, the suggested item being taken from choice space items available to the user, wherein at least some of the choice space items are associated with one of two or more categories created based upon the choice space items, and wherein the choice space items comprise world wide web page addresses, the method comprising the steps of:

(1) observing when one or more world wide web pages are actually accessed by the user and associating each of said one or more world wide web pages with at least one of the two or more categories, wherein each observation contains an amount of time the user accessed said accessed world wide web pages, and wherein a category entry of a category associated with said accessed world wide web pages is offset by an amount representative of said amount of time;

(2) weighting the two or more categories based upon said observing of said step (1);

(3) suggesting, to the user, the suggested item from the choice space, wherein the suggested item is chosen from at least one of the two or more categories having at least a pre-defined weight.

44. A computer-readable medium for use with a computer, wherein said computer-readable medium allows a suggested item to be provided to a user based upon observations of the user, wherein the suggested item is taken from choice space items available to the user, wherein the choice space items comprise world wide web page addresses and are divisible into two or more categories, comprising:

observation means for receiving an observation indicating that one or more world wide web pages were actually accessed by the user and for associating each of said one or more accessed world wide web pages with at least one of the two or more categories;

wherein each observation contains an amount of time the user accessed said accessed world wide web pages, and wherein a category entry of a category associated with said accessed world wide web pages is offset by an amount representative of said amount of time;

weighting means for weighting said two or more categories based upon said observation of said observation means;

suggestion means for presenting, to the user, the suggested item from the choice space, wherein the suggested item is chosen from said two or more categories having at least a pre-defined weight as determined by said weighting means.

45. A computer-readable medium for providing a suggested item to a user based upon explicit input by and observations of the user, the suggested item being taken from choice space items available to the user, wherein at least some of the choice space items are associated with one of two or more categories created based upon the choice space items, by comprising the steps of:

(1) receiving, from a user, explicit input indicating a preference for one or more of the two or more categories;

(2) observing when one or more choice space items are actually accessed by the user and associating each of said one or more accessed choice space items with at least one of the two or more categories;

(3) weighting the two or more categories based upon said explicit input of said step (1) and based upon said observing of said step (2);

(4) suggesting, to the user, the suggested item from the choice space, wherein the suggested item is chosen from at least one of the two or more categories having at least a pre-defined weight, wherein said step (2) comprises the step of observing an amount of time the user accessed said accessed choice space item, wherein a category entry of a category associated with said accessed choice space item is offset by an amount representative of said amount of time.

46. The computer-readable medium of claim 45, wherein said step (3) comprises the step of utilizing a category interest structure, wherein said category interest structure comprises two or more entries corresponding to the two or more categories.

47. The computer-readable medium of claim 46, further comprising the step of updating an entry within said category interest structure corresponding to said one or more choice space items actually accessed by the user.

48. The computer-readable medium of claim 47, wherein said step (2) comprises the step of recording the point in time that each of said accessed choice space items is observed, wherein, by the occurrence of a designated event, each of said two or more entries of said category interest structure is offset by an amount corresponding to accessed choice space items observed prior to a specified time period.

49. The computer-readable medium of claim 47, wherein the observations and explicit input are received from at least two users, wherein each of the at least two users has an associated category interest structure.

50. The computer-readable medium of claim 49, wherein the point in time that each of said accessed choice space items of said step (2) is observed is recorded for each of the at least two users, wherein, by the occurrence of a designated event, each of said two or more entries of a category interest structure for at least one of said at least two users is offset by an amount corresponding to accessed choice space items observed prior to a specified time period.

51. The computer-readable medium of claim 46, further comprising the step of updating an entry within said category interest structure corresponding to said explicit input of said step (1).

52. The computer-readable medium of claim 51, wherein said explicit input contains a reference to at least one of the two or more categories.

53. The computer-readable medium of claim 46, wherein said step (4) comprises the step of receiving an indication from the user as to when the suggested item should be suggested to the user.

54. The computer-readable medium of claim 46, wherein said step (4) comprises the step of periodically suggesting at least one suggested item in the choice space to the user.

55. The computer-readable medium of claim 45, wherein said step (4) comprises the step wherein the suggested item is chosen based upon additional criteria.

56. The computer-readable medium of claim 55, wherein said additional criteria comprises that the user has not previously selected the suggested item.

57. The computer-readable medium of claim 55, wherein said additional criteria comprises that the suggested item is available to the user concurrently with a current item being accessed.

58. A machine for providing a suggested item to a user based upon explicit input by and observations of the user, wherein the suggested item is taken from choice space items available to the user, comprising:

a knowledgebase containing a list of the choice space items, wherein the list is divided into two or more categories;

a collection module for receiving observations from the user, wherein each of said observations indicates an accessed choice space item actually accessed by the user, said collection module also for receiving explicit input from the user indicating user preference concerning the choice space items, wherein said accessed choice space item and said explicit input are associated with one of said two or more categories of said knowledgebase;

a category interest structure, wherein said category interest structure is divided into two or more category entries corresponding to said two or more categories of said knowledgebase, wherein said category entries are weighted in accordance with said accessed choice space item and said explicit input;

a suggestions module, wherein said suggestions module presents the suggested item from the choice space to the user, wherein the suggested item is chosen from one of said two or more categories having a corresponding category entry of at least a pre-defined weight, wherein each of said observations contains an amount of time the user accessed said accessed choice space item, and wherein a category entry of a category associated with said accessed choice space item is offset by an amount representative of said amount of time.

59. A machine for providing a suggested item to a user based upon explicit input by and observations of the user, wherein the suggested item is taken from choice space items available to the user, comprising:

a knowledgebase containing a list of the choice space items, wherein the list is divided into two or more categories;

a collection module for receiving observations from the user, wherein each of said observations indicates an accessed choice space item actually accessed by the user, said collection module also for receiving explicit input from the user indicating user preference concerning the choice space items, wherein said accessed choice space item and said explicit input are associated with one of said two or more categories of said knowledgebase;

a category interest structure, wherein said category interest structure is divided into two or more category entries corresponding to said two or more categories of said knowledgebase, wherein said category entries are weighted in accordance with said accessed choice space item and said explicit input;

a suggestions module, wherein said suggestions module presents the suggested item from the choice space to the user, wherein the suggested item is chosen from one of said two or more categories having a corresponding category entry of at least a pre-defined weight, wherein the suggested item from said two or more categories is chosen based upon at least one of the following additional criteria:

(a) the user has not previously accessed said suggested item;

(b) said suggested item appeared in said knowledgebase within a pre-defined range of dates;

(c) said suggested item is referenced in at least two of said two or more categories each having a corresponding category entry of at least a pre-defined weight;

(d) said suggested item is available to the user concurrently with a current item being accessed.

60. A computer-readable medium for use with a computer, wherein said computer-readable medium allows a suggested item to be provided to a user based upon explicit input by and observations of the user, wherein the suggested item is taken from choice space items available to the user, wherein the choice space items are divisible into two or more categories, comprising:

reception means for receiving, from a user, explicit input indicating a preference for one or more of the two or more categories;

observation means for receiving an observation indicating that one or more choice space items were actually accessed by the user and for associating each of said one or more accessed choice space items with at least one of the two or more categories;

weighting means for weighting said two or more categories based upon said explicit input of said reception means and based upon said observation of said observation means;

suggestion means for presenting, to the user, the suggested item from the choice space, wherein the suggested item is chosen from said two or more categories having at least a pre-defined weight as determined by said weighting means,
   wherein the suggested item from the two or more categories is chosen based upon at least one of the following additional criteria:
      (a) the user has not previously accessed the suggested item;
      (b) the suggested item appeared as one of the choice space items within a pre-defined range of dates;
      (c) the suggested item is referenced in at least two of said two or more categories each having a corresponding category entry of at least a pre-defined weight;
      (d) the suggested item is available to the user concurrently with a current item being accessed.

61. A machine for providing a suggested item to a user based upon explicit input by and observations of the user, wherein the suggested item is taken from a choice space of items available to the user, comprising:
   a knowledgebase containing a list of choice space items, wherein said list is divided into two or more categories;
   a user input device for allowing a user to enter the explicit input, thereby indicating a preference for at least one of said two or more categories
      said user input device also for allowing the user to choose choice space items for accessing;
   a communication link for transmitting the explicit input and observations to a collection module;
   said collection module for receiving observations from the user, wherein each of said observations indicates an accessed choice space item actually accessed by the user,
      said collection module also for receiving explicit input from the user indicating user preference relating to the items in the choice space,
      wherein said accessed choice space item and said explicit input are associated with one of said two or more categories of said knowledgebase;
   a category interest structure, wherein said category interest structure is divided into category entries corresponding to said two or more categories of said knowledgebase,
      wherein said category entries are weighted in accordance with said accessed choice space item and said explicit input;
   a suggestions module, wherein said suggestions module presents the suggested item from the choice space to the user, wherein the suggested item is chosen from one of said two or more categories having a corresponding category entry of at least a pre-defined weight,
      wherein each observation contains an amount of time the user accessed said accessed choice space item, and wherein a category entry of a category associated with said accessed choice space item is incremented by an amount representative of said amount of time.

62. A machine for providing a suggested item to a user based upon explicit input by and observations of the user, wherein the suggested item is taken from a choice space of items available to the user, comprising:
   a knowledgebase containing a list of choice space items, wherein said list is divided into two or more categories;
   a user input device for allowing a user to enter the explicit input, thereby indicating a preference for at least one of said two or more categories
      said user input device also for allowing the user to choose choice space items for accessing;
   a communication link for transmitting the explicit input and observations to a collection module;
   said collection module for receiving observations from the user, wherein each of said observations indicates an accessed choice space item actually accessed by the user,
      said collection module also for receiving explicit input from the user indicating user preference relating to the items in the choice space,
      wherein said accessed choice space item and said explicit input are associated with one of said two or more categories of said knowledgebase;
   a category interest structure, wherein said category interest structure is divided into category entries corresponding to said two or more categories of said knowledgebase,
      wherein said category entries are weighted in accordance with said accessed choice space item and said explicit input;
   a suggestions module, wherein said suggestions module presents the suggested item from the choice space to the user, wherein the suggested item is chosen from one of said two or more categories having a corresponding category entry of at least a pre-defined weight,
      wherein the suggested item from said two or more categories is chosen based upon at least one of the following additional criteria:
         (a) the user has not previously accessed said suggested item;
         (b) said suggested item appeared in said knowledgebase within a pre-defined range of dates;
         (c) said suggested item is referenced in at least two of said two or more categories each having a corresponding category entry of at least a pre-defined weight;
         (d) said suggested item is available to the user concurrently with a current item being accessed.

* * * * *